United States Patent
Hayashi (10) Patent No.: US 7,826,323 B2
(45) Date of Patent: Nov. 2, 2010

(54) REPRODUCING APPARATUS AND METHOD WITH REDUCED BIT ERROR RATE

(75) Inventor: Kenichi Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 654 days.

(21) Appl. No.: 11/811,927

(22) Filed: Jun. 12, 2007

(65) Prior Publication Data

US 2007/0286048 A1 Dec. 13, 2007

(30) Foreign Application Priority Data

Jun. 13, 2006 (JP) .............................. 2006-163410

(51) Int. Cl.
G11B 20/10 (2006.01)
(52) U.S. Cl. ................................. 369/59.22
(58) Field of Classification Search ............... 369/59.17, 369/59.18
See application file for complete search history.

(56) References Cited

U.S. PATENT DOCUMENTS

2005/0063276 A1* 3/2005 Ogura ...................... 369/59.22
2005/0219985 A1* 10/2005 Nakahira ................. 369/59.13

FOREIGN PATENT DOCUMENTS

JP 2005-093033 4/2005

\* cited by examiner

*Primary Examiner*—William J Klimowicz
*Assistant Examiner*—Mark L Fischer
(74) *Attorney, Agent, or Firm*—Wolf, Greenfield & Sacks, PC (57) ABSTRACT

A reproducing apparatus includes a signal reading unit for reading a signal from a recording medium, an equalizing unit for performing partial response equalization on the read signal and outputting an equalized signal, a maximum likelihood decoding unit for performing maximum likelihood decoding on the equalized signal to decode binary data and outputting a binary data string, a determining unit for determining whether or not a shortest code in the binary data string obtained by the maximum likelihood decoding is correct, on the basis of information on an amplitude of the equalized signal corresponding to the shortest code, a code correcting unit for correcting the shortest code in the binary data string, in accordance with a result of the determination of the determination unit, and a data demodulating unit for demodulating the binary data string obtained through the code correcting unit to obtain reproduction data from the recording medium.

5 Claims, 10 Drawing Sheets

REPRODUCING APPARATUS AND METHOD WITH REDUCED BIT ERROR RATE

CROSS REFERENCES TO RELATED APPLICATIONS

The present invention contains subject matter related to Japanese Patent Application JP 2006-163410 filed in the Japanese Patent Office on Jun. 13, 2006, the entire contents of which are incorporated herein by reference.

BACKGROUND OF THE INVENTION

1. Field of the Invention

The present invention relates to reproducing apparatuses and reproducing methods for reproducing information from recording medium on which information is recorded using run-length limited coding.

2. Description of the Related Art

Data recording techniques using optical discs such as CDs (compact discs) and DVDs (digital versatile discs) as recording media for recording/reproducing digital data are known.

Optical discs include, for example, reproduction-only optical discs, such as CDs, CD-ROMs (CD read-only memories), and DVD-ROMs (DVD read-only memories), on which information is recorded as embossed pits, and recordable optical discs, such as CD-Rs (CD recordables), CD-RWs (CD rewritables), DVD-R (DVD recordables), DVD-RWs (DVD rewritables), DVD+RWs (DVD plus rewritables), and DVD-RAMs (DVD random access memories) on which user data can be recorded. Data can be recorded on such recordable optical discs by employing recording techniques such as magneto-optical recording, phase-change recording, and dye-film change recording. Dye-film change recording is also called write-once recording and is preferred for a data storage application, since it permits recording of data only one time and does not permit rewriting over recorded data. In magneto-optical recording and phase-change recording, on the other hand, rewriting of data is permitted. Thus, these recording techniques are used for various applications such as recording of content data of music, movies, games, and application programs.

In recent years, a high-density optical disc called Blu-ray Disc® has been developed with a view to significantly increasing recording capacity.

These optical discs store information in the form of embossed pits, dye-change marks, phase change marks, or the like (hereinafter collectively referred to as "marks"). In many cases, marks on a disc are formed on the basis of a signal obtained by modulating original data into run-length limited codes.

SUMMARY OF THE INVENTION

In recent years, PRML (partial-response maximum-likelihood) techniques are employed for processing for decoding readout signals (reproduction RF signals) read from optical discs into binary data strings. It is well known that optical disc reproducing apparatuses using PRML techniques reproduce information digitally recorded on optical discs with a low bit error rate of reproduction signals containing noise, phase distortion, or the like compared with optical disc reproducing apparatuses in which binary data strings are obtained by binary detection with simple level determination.

However, when recording conditions such as laser power and laser drive pulse waveform are deviated from optimum conditions during recording on optical discs, there may be cases in which bit errors occur in PRML processing whereas bit errors do not occur in binary detection.

To date, such cases have rarely arisen, and have not been of much concern. Thus, this problem has rarely been addressed.

However, it is anticipated that there will be an increased number of cases where recording conditions deviate from optimum conditions, due to a recent increase in the recording speed of optical discs. This degrades recording signal quality, which causes an increase in bit error rate due to waveform distortion.

Japanese Unexamined Patent Application Publication No. 2005-93033 provides a proposal for overcoming the above problem. In this proposal, a distortion of a long mark is measured, and if a value corresponding to the distortion is greater than a predetermined value, signal detection processing by binary detection is performed instead of PRML signal detection. In this case, however, when this arrangement is implemented using an actual circuit, a large scale circuit is necessary for the distortion detection. In addition, if the signal detection scheme is switched from PRML to binary detection when the value corresponding to distortion is greater than the predetermined value, the effect obtained by employing the PRML scheme, i.e., the effect of reducing an error rate due to noise and phase distortion, has to be reduced. As a result, the performance of an optical disc reproducing apparatus in its entirety is degraded.

In view of the foregoing, there is a need for a technique which reduces bit errors due to waveform distortions even when information recorded on recording media with low recording signal quality is reproduced using PRML techniques.

A reproducing apparatus according to an embodiment of the present invention for reproducing information from a recording medium on which information is recorded using a run-length-limited code in which a shortest code and a longest code are defined includes a signal reading unit for reading a signal from the recording medium, an equalizing unit for performing partial response equalization on the read signal and outputting an equalized signal, a maximum likelihood decoding unit for performing maximum likelihood decoding on the equalized signal to decode binary data and outputting a binary data string, a determining unit for determining whether or not the shortest code in the binary data string obtained by the maximum likelihood decoding is correct, on the basis of information on an amplitude of the equalized signal corresponding to the shortest code, a code correcting unit for correcting the shortest code in the binary data string, in accordance with a result of the determination of the determination unit, and a data demodulating unit for demodulating the binary data string obtained through the code correcting unit to obtain reproduction data from the recording medium.

The determining unit determines whether or not the shortest code in a binary data string is correct, on the basis of a result of comparison between the amplitude information of the equalized signal corresponding to the shortest code and a predetermined amplitude determination threshold.

A reproducing method according to an embodiment of the present invention includes the steps of outputting an equalized signal by performing partial response equalization on a signal read from the recording medium, decoding binary data by performing maximum likelihood decoding on the equalized signal and outputting a binary data string, determining whether or not the shortest code in the binary data string obtained by the maximum likelihood decoding is correct, on the basis of information on an amplitude of the equalized signal corresponding to the shortest code, correcting the shortest code in the binary data string, in accordance with a result of the determination, and demodulating the binary data string obtained through the correction to obtain reproduction data from the recording medium.

According to the present invention, distortion which occurs in a recording medium such as an optical disc and operations of the maximum likelihood decoder are taken into account, and an amplitude value of an equalized signal (a signal input to the maximum likelihood decoder) corresponding to a shortest code detected by the maximum likelihood decoder is evaluated, and it is determined whether or not the decoded shortest code is correct. If the shortest code is determined to be incorrect, correction of the shortest code is performed. With this technique, a bit error rate of a signal with distortion can be reduced compared with a known signal detection technique using a typical maximum likelihood decoding.

According the present invention, when there is a shortest code in a binary data string obtained through decoding performed by a maximum likelihood decoder, the correctness of the shortest code is determined using an amplitude value of an equalized signal corresponding to the shortest code. Then if the shortest code is determined to be incorrect, the shortest code is corrected.

The above technique can advantageously reduce a bit error rate of a signal with distortion compared with a known signal detection technique using a typical maximum likelihood decoder while taking advantage of maximum likelihood decoding.

As a result of the reduced bit error rate, the data reproduction performance of a reproducing apparatus can be enhanced, allowing the reproducing apparatus to reproduce data recorded on a recording medium whose recording signal quality is relatively poor.

In addition, the determination unit simply serves to perform comparison between an amplitude value of an equalized signal and an amplitude determination threshold, and the code correction unit simply serves to invert a shortest code if the shortest code is determined to be incorrect as a result of correctness determination. This simplifies a circuit configuration and facilitates LSI (large-scale integrated) implementation, which is advantageous in view of power consumption and operation speed.

DESCRIPTION OF THE PREFERRED EMBODIMENTS

In the following, the preferred embodiments of a reproducing apparatus and a reproducing method according to an embodiment of the present invention will be described using an example a disc drive apparatus which is compatible with Blu-ray discs.

A disc drive apparatus according to the present embodiment is capable of recording/reproducing information on recording media such as Blu-ray discs including reproduction-only discs and recordable discs (write-once discs and rewritable discs).

In the case of a recordable disc, recording/reproduction of recording marks such as phase-change marks and dye-change marks is performed under recording conditions including a combination of a laser having a wavelength of 405 nm (i.e., a blue laser) and an objective lens with an NA of 0.85. In addition, recording/reproduction is performed on the recordable disc having a track pitch of 0.32 µm and a linear density of 0.12 µm/bit, and an RUB (recording unit block) of a 64 KB (kilobyte).

As for a ROM disc, reproduction-only data is recorded in the form of embossed pits having a depth of $\gamma/4$. The track pitch and the linear density of the ROM disc are 0.32 µm and 0.12 µm/bit, respectively, and the size of one RUB is 64 KB.

The RUB has a total of 498 frames generated by adding, for example, a link area of one frame to each of the top and the bottom of an ECC block (cluster) of 156 symbols×496 frames, which will be described below.

In the case of a recordable disc, a wobbling groove is formed on the recordable disc, and this wobbling groove serves as a recording/reproduction track. The wobbling of the groove represents so-called ADIP (address-in-pregroove) data. That is, by detecting wobbling information of the groove, addresses on the disc can be obtained.

Recording marks are provided as phase-change marks on a track of a recordable disc which is formed by a wobbling groove. The phase change marks are recorded to have a linear density of 0.12 µm/bit and 0.08 µm/channel-bit, using, for example, an RLL (1-7) PP modulation technique (RLL: run-length limited, PP: parity preserve/prohibit RMTR (repeated minimum transition runlength)).

When a channel clock cycle is "T", the length of a mark is in the range 2T to 8T. That is, the minimum length of a code as a data pattern is 2T, and the maximum code length is 8T. In this case, the length of a sync pattern is set as 9T, which is out of the range 2T to 8T.

When a reproduction-only disc is used, no groove is provided on the disc. However, data which is similarly modulated through RLL (1-7) PP modulation is recorded as an embossed pit array.

Figure 1:
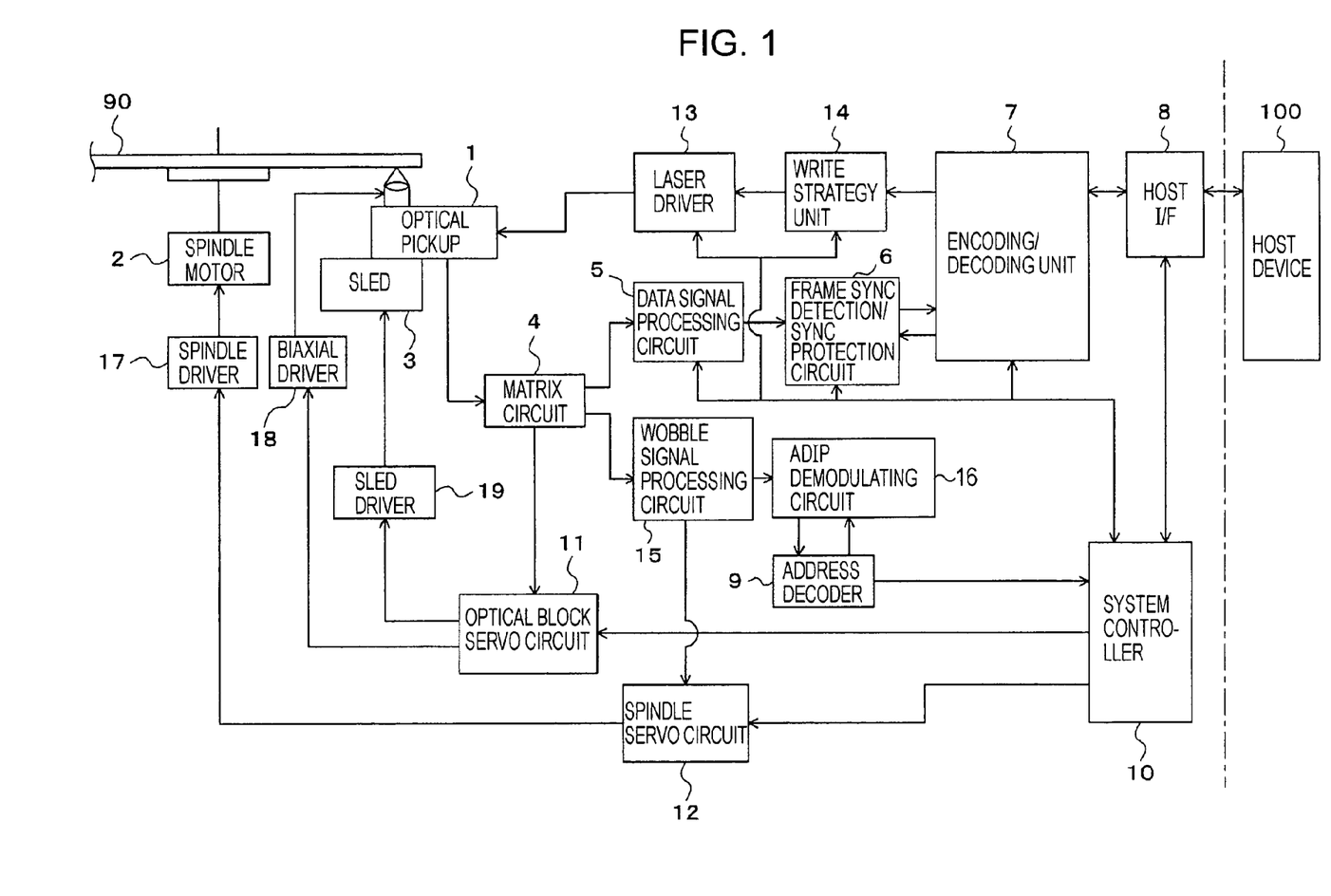
FIG. 1 is a block diagram illustrating a disc drive apparatus according to an embodiment of the present invention.

Referring to FIG. 1, a disc drive apparatus for recording/reproducing information on the above-described discs will be described.

A disc 90 can be, for example, a reproduction-only Blu-ray disc or a recordable Blu-ray disc, as described above.

The disc 90 is mounted on a turntable (not shown) and driven by a spindle motor 2 so as to rotate at a constant linear velocity (CLV) during a recording/reproduction operation.

For reproduction, information represented by marks (pits) recorded on a truck on the disc 90 is read using an optical pickup (optical head) 1.

If the disc 90 is a recordable disc, user data is recorded on the track of the disc 90 by the optical pickup 1 as phase-change marks or dye-change marks.

On the disc 90, management information for reproduction such as physical information on the disk 90 is recorded as embossed pits or a wobbling groove. This information is also read by the optical pickup 1. In addition, if the disc 90 is a recordable disc, ADIP information embedded as wobbling of the groove track on the disc 90 is also read using the optical pickup 1.

The optical pickup 1 includes a laser diode serving as a laser light source, a photodetector for detecting reflected light, and an objective lens serving as an output end of laser light. The optical pickup 1 also includes an optical system for irradiating laser light onto a disc recording surface through the objective lens and guiding the reflected light to the photodetector. The laser diode generates a so-called blue laser with a wavelength of 405 nm. The optical system has an NA (numerical aperture) of 0.85.

In the optical pickup 1, the objective lens is supported by a biaxial mechanism so as to be movable in the tracking direction and the focus direction.

A sled mechanism 3 permits the entire optical pickup 1 to move in a disc radial direction.

The laser diode is driven by a drive signal (drive current) fed from a laser driver 13 so as to provide laser emission.

Information on light reflected from the disc 90 is detected by the photodetector and then converted into an electric signal based on the intensity of the detected light. The electric signal is supplied to a matrix circuit 4.

The matrix circuit 4 is provided with a current-voltage conversion circuit and a matrix calculation/amplification circuit for processing output currents from a plurality of light-receiving elements constituting the photodetector, so as to generate a signal necessary for matrix processing.

The matrix circuit 4 generates, for example, an RF (radio frequency) signal (also referred to as a reproduction data signal) corresponding to reproduction data, a focus error signal, and a tracking error signal for servo control.

The matrix circuit 4 also generates a push-pull signal for detecting wobbling of a groove.

A reproduction data signal (RF signal) output from the matrix circuit 4 is supplied to a data signal processing circuit 5. A focus error signal and a tracking error signal are supplied to an optical block servo circuit 11, and a push-pull signal is supplied to a wobble signal processing circuit 15.

The data signal processing circuit 5 performs binarization processing on a reproduction signal and supplies a resultant binary data string to a frame sync detection/sync protection circuit 6.

Figure 2:
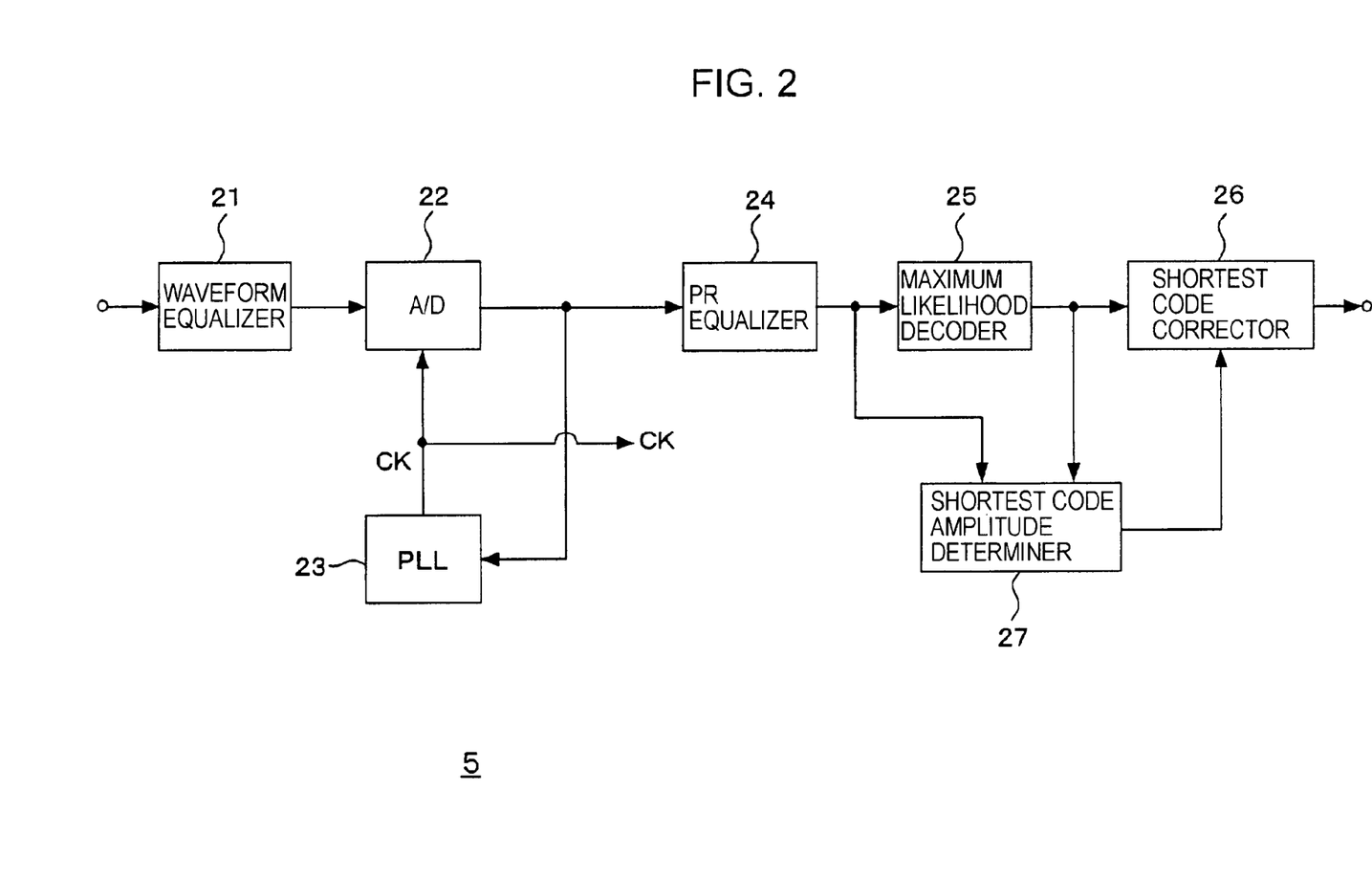
FIG. 2 is a block diagram illustrating a data signal processing circuit according to an embodiment of the present invention.

A configuration of the data signal processing circuit will be described in detail below with reference to FIG. 2. In the data signal processing circuit 5, A/D (analogue to digital) conversion of RF signals, reproduction clock generation processing using a PLL (phase-locked loop), PR (partial response) equalization, and Viterbi decoding (maximum likelihood decoding) are performed. That is, a binary data string is obtained through partial-response maximum-likelihood decoding processing (PRML detection).

Now, partial-response maximum-likelihood decoding is briefly described. Recently, the partial-response maximum-likelihood detection technique has widely been used as a reproducing scheme for optical discs. The partial-response maximum-likelihood is a technique implemented by combining a process of partial response and a process of maximum likelihood detection. In this technique, a partial response sequence that minimizes a Euclidean distance of a signal read from a disc is detected.

A partial response sequence can be obtained by performing a weighted sum defined by a target response on a bit sequence. In an optical disc system, partial response sequences such as PR(1, 2, 1) and PR(1, 2, 2, 1) are used. For example, PR(1, 2, 2, 1) indicates that a value obtained by assigning weights of 1, 2, 2, 1 to a bit sequence is returned as a partial response value. Partial response refers to a process of returning an output longer than one bit in response to a one-bit input. In particular, a process of obtaining a reproduction signal as a signal obtained by multiplying an input of four consecutive information bits by, in sequence, 1, 2, 2, and 1 and summing the results is expressed as PR(1, 2, 2, 1).

Maximum likelihood detection is a technique including processes of defining a distance called a Euclidean distance between two signals, determining a distance between an actual signal and a signal predicted from an assumed bit-sequence, and detecting a bit sequence providing the closest Euclidean distance. In this case, the Euclidean distance is defined as a distance obtained by adding the squares of differences in amplitude between two signals at same times over a whole time period. Viterbi detection is used to search for the bit sequence producing the closest Euclidean distance.

Partial-response maximum-likelihood detection combining these techniques includes processes of adjusting a signal obtained from bit information on a recording medium so that the signal is in a partial response process using a filter called an equalizer, determining a Euclidean distance between the resultant reproduction signal and the partial response of an assumed bit sequence, and detecting a bit sequence producing the closest Euclidean distance.

An algorithm based on the above-mentioned Viterbi detection is effective in actually searching for a bit sequence producing a minimum Euclidean distance.

For the Viterbi detection, a Viterbi detector having a plurality of states formed of consecutive bits of a predetermined length as a unit and branches represented by transitions between the states is used, and is configured to detect a desired bit sequence efficiently from among all possible bit sequences.

An actual circuit is provided with two registers for each state, including a register referred to as a path metric register which stores a Euclidean distance (path metric) between a partial response sequence and a corresponding signal up to the state and a register referred to as a path memory register which stores a flow of a bit sequence (path memory) up to the state. The circuit is also provided with an operation unit referred to as a branch metric unit for each branch, for calculating a branch metric between a partial response sequence and a corresponding signal for each bit.

The Viterbi detector can bring various bit sequences into one-to-one correspondence with individual paths passing through the states. A Euclidean distance between a partial response sequence passing through these paths and an actual signal (reproduction signal) can be obtained by sequentially adding together the above-mentioned branch metrics of inter-state transitions forming the paths, that is, branches.

Further, paths that minimize the above-described Euclidean distance can be selected by comparing the magnitudes of path metrics of two branches or less reached in each state, and sequentially selecting a path with a smaller path metric. Information on this selection is transferred to the path memory register, so that information representing a path reaching each state by a bit sequence is stored. The value of the path memory register ultimately converges to a bit sequence that minimizes the Euclidean distance while being sequentially updated, and the result is output. With this arrangement, a bit sequence that produces a partial response sequence whose Euclidean distance is closest to the reproduction signal as described above can efficiently be searched.

The data signal processing circuit 5 uses the above partial-response maximum-likelihood scheme to output a binary data string as information read from the disc 90.

The frame sync detection/sync protection circuit 6 performs synchronization detection on the binary data string output from the data signal processing circuit 5 and synchronization protection processing for stable frame sync detection.

The encoding/decoding unit 7 performs demodulation of reproduction data in reproduction processing and modulation of recording data in recording. Specifically, the encoding/decoding unit 7 performs processing such as data demodulation, deinterleaving, ECC decoding, and address decoding for reproduction and performs processing such as ECC encoding, interleaving, and data modulation for recording.

In reproduction, a binary data string decoded by the data signal processing circuit 5 and a demodulation timing signal based on frame sync detection by the frame sync detection/sync protection circuit 6 are supplied to the encoding/decoding unit 7. The encoding/decoding unit 7 performs demodulation of the binary data string at timing specified by the modulation timing signal based on the frame sync detection so as to obtain reproduction data from the recording medium. Specifically, in the encoding/decoding unit 7, reproduction data of the disc 90 is obtained by demodulating data which has been RLL (1-7) PP modulated and recorded on the disc 90 and by performing ECC decoding for error correction.

Data decoded into reproduction data by the encoding/decoding unit 7 is transferred to a host interface 8 and then transferred to a host device 100 on the basis of an instruction of a system controller 10. The host device 100 can be a computer apparatus or an AV (audio-visual) system device, for example.

When the disc 90 is a recordable disc, processing on ADIP information is performed in a recording/reproduction process.

Specifically, a push-pull signal associated with wobbling of a groove is output from the matrix circuit 4 and then processed in the wobble signal processing circuit 15 into digital wobble data. In addition, a clock synchronized with the push-pull signal is generated by PLL processing.

The wobble data is MSK (minimum shift keying) modulated and STW (saw tooth wobble) modulated into a data stream which forms an ADIP address, and the data stream is supplied to an address decoder 9.

The address decoder 9 performs decoding of the supplied data to obtain an address value. The address decoder 9 then supplies the address value to the system controller 10.

In recording, recording data is supplied from the host device 100 to the encoding/decoding unit 7 through the host interface 8.

In this case, the encoding/decoding unit 7 performs encoding processing on the recording data such as addition of an error correction code (ECC encoding), an interleaved code, a subcode, etc. The encoding/decoding unit 7 then modulates the processed data using the RLL (1-7) PP modulation technique.

The recording data processed by the encoding/decoding unit 7 undergoes recording compensation processing in a write strategy unit 14, such as fine adjustment of the optimum recording power with respect to the characteristics of recording layers, the shape of a laser spot of laser light, recording linear density, etc., and adjustment of a laser drive pulse waveform. Then, the recording data is supplied to the laser driver 13 as a laser drive pulse. The adjustment of laser drive pulse waveform is performed on the basis of an instruction of the system controller 10.

The laser driver 13 provides the laser drive pulse, which have undergone the recording compensation processing, to a laser diode in the optical pickup 1 so as to drive light emission of the laser diode. Thus, marks corresponding to the recording data are formed on the disc 90.

In addition, the laser driver 13 is provided with a so-called APC (auto power control) circuit for controlling laser output to be constant regardless of temperature or the like. This laser output control is performed by monitoring the power of laser output using output of a detector for laser poser monitoring which is provided in the optical pickup 1. A target value of laser output for recording/reproduction is provided from the system controller 10. During recording/reproduction, the system controller 10 performs controls so that the laser output level is maintained at the target level.

The optical block servo circuit 11 generates various servo drive signals for executing a servo operation, from a focus error signal and a tracking error signal received from the matrix circuit 4. Such servo drive signals include a focus drive signal, a tracking drive signal, and a sled drive signal.

Specifically, the optical block servo circuit 11 generates a focus drive signal and a tracking drive signal in accordance with a focus error signal and a tracking error signal, so as to drive a focus coil and a tracking coil of the biaxial mechanism in the optical pickup 1 using a biaxial driver 18. Thus, a focus servo loop and a tracking servo loop are constituted by the optical pickup 1, the matrix circuit 4, optical block servo circuit 11, the biaxial driver 18, and the biaxial mechanism.

Further, the optical block servo circuit 11 turns off the tracking servo loop in response to a track-jump command sent from the system controller 10 and outputs a jump-drive signal so as to perform a track-jump operation.

The optical block servo circuit 11 also generates a sled drive signal for driving the sled mechanism 3 using a sled driver 19, on the basis of a sled error signal obtained as a low frequency component of the tracking error signal and on the basis of access execution control performed by the system controller 10. The sled mechanism 3 has a mechanism including a main shaft that holds the optical pickup 1, a sled motor, a transmission gear, etc., although these parts are not shown. The sled mechanism 3 drives the sled motor in accordance with the sled drive signal such that intended slide movement of the optical pickup 1 is achieved.

A spindle servo circuit 12 performs control of CLV rotation of the spindle motor 2, for example.

The spindle servo circuit 12 obtains information on a current angular velocity of the spindle motor 2 from a clock generated through PLL processing on the wobble signal. The spindle servo circuit 12 then compares the obtained angular velocity information with predetermined reference CLV information, thereby generating a spindle error signal.

In data reproduction, a reproduction clock generated by a PLL in the data signal processing circuit 5 serves as current angular velocity information of the spindle motor 2. Therefore, the spindle servo circuit 12 can also generate a spindle error signal by comparing this angular velocity information with the predetermined reference CLV information.

Further, the spindle servo circuit 12 outputs a spindle drive signal generated in accordance with the spindle error signal so as to activate the CLV rotation of the spindle motor 2 using the spindle driver 17.

The spindle servo circuit 12 also generates a spindle drive signal on the basis of a spindle kick/brake control signal from the system controller 10, so as to drive start, stop, acceleration, or deceleration of the spindle motor 2.

The various operations of the servo system and the recording/reproduction system described above are controlled by the system controller 10 which is constituted by a microcomputer.

The system controller 10 executes various operations in accordance with a command provided by the host device 100 through the host interface 8.

In response to a write command, for example, sent from the host device 100, the system controller 10 first moves the optical pickup 1 to a position corresponding to an address to which data is to be written. Then, the system controller 10 causes the encoding/decoding unit 7 to perform encoding as described above on data such as video data and audio data transferred from the host device 100. Thus, recording is carried out using the laser driver 13 driven for laser emission in accordance with the encoded data.

When a read command instructing transfer of data recorded on the disc 90 is provided from the host device 100, the system controller 10 first performs control of seek operation in which a target address is sought. Specifically, the system controller 10 instructs the optical block servo circuit 11 to execute an access operation of the optical pickup 1 for accessing the data corresponding to the target address designated by a seek command.

Then, the system controller 10 performs operation control necessary for transferring data in the designated data zone to the host device 100. Specifically, the system controller 10 reads the data from the disc 90 and controls the data signal processing circuit 5, the frame sync detection/sync protection circuit 6, and the encoding/decoding unit 7 to perform reproduction processing. Then, the system controller 10 transfers the designated data to host device 100.

In the foregoing, the example of a disc drive apparatus has been described using FIG. 1 as a disc drive apparatus connected to the host device 100. However, the disc drive apparatus according to an embodiment of the present invention is not limited to this example and may not necessarily be connected to another device. In this case, the disc drive apparatus has a different interface configuration for data input/output. For example, the disc drive apparatus can be provided with an operation unit, a display unit, or the like. In other words, any interface configuration can be applied to the disc drive apparatus as long as recording or reproduction can be performed in accordance with a user operation and a terminal unit is provided for inputting/outputting of various data.

Needless to say, a variety of other configurations of the disc drive apparatus is applicable to the present invention. For example, the disc drive apparatus may be a reproduction-only apparatus.

In such a disc drive apparatus described above, distortion which occurs in the optical disc 90 and a maximum likelihood decoding operations are taken into account, and an amplitude value of an equalized signal corresponding to a shortest code detected through maximum likelihood decoding is evaluated, so that correction of the detected shortest code is performed. With this technique, a bit error rate of a signal with distortion can be reduced compared with a known signal detection technique using a typical maximum likelihood decoding.

To this end, the data signal processing circuit 5 has a configuration as illustrated below.

The data signal processing circuit 5 has a waveform equalizer 21, an A/D converter 22, a PLL circuit 23, a PR (partial response) equalizer 24, a maximum likelihood decoder 25, a shortest code corrector 26, and a shortest code amplitude determiner 27.

An RF signal obtained in the matrix circuit 4 is input to the waveform equalizer 21 in the data signal processing circuit 5 and equalized so as to be suitable for clock reproduction. The equalized RF signal is then supplied to the A/D converter 22 and converted into digital data (reproduction digital signal).

The PLL circuit 23 forms a phase-locked loop using the reproduction digital signal output from the A/D converter 22 and generates a clock CK for use in reproduction processing. The clock CK generated by the PLL circuit 23 serves as a sampling clock of the A/D converter 22 and is used for processing performed by PR equalizer 24, the maximum likelihood decoder 25, the shortest code corrector 26, and the shortest code amplitude determiner 27.

The reproduction digital signal output from the A/D converter 22 is processed by a PRML signal processing system constituted by the PR equalizer 24 and the maximum likelihood decoder 25. Modulated data binarized into "1" and "0" is obtained by the PR equalizer 24 and the maximum likelihood decoder 25.

The PRML processing of the PR equalizer 24 and the maximum likelihood decoder 25 is described above. For example, the PR equalizer 24 performs equalization processing such as PR (1, 2, 1) or PR (1, 2, 2, 1) equalization to obtain a PR equalized signal. Then, the PR equalized signal is supplied to the maximum likelihood decoder 25. The maximum likelihood decoder 25 performs Viterbi detection on the input equalized signal and outputs a binary data string as decoded data.

The decoded data output from the maximum likelihood decoder 25 is supplied to the shortest code corrector 26 and to the shortest code amplitude determiner 27.

The PR equalized signal output from the PR equalizer 24 is supplied to the shortest code amplitude determiner 27.

The shortest code amplitude determiner 27 determines whether or not a code of minimum length 2T (hereinafter also referred to as a 2T code or a shortest code) in decoded data is correct. Specifically, the shortest code amplitude determiner 27 detects a shortest code 2T in the decoded data (binary data string) output from the maximum likelihood decoder 25. When a 2T code is detected, the shortest code amplitude determiner 27 compares a PR equalized signal corresponding to the 2T code with a predetermined amplitude determination threshold and determines whether or not the 2T code is correct using a result of the comparison.

Then, the shortest code amplitude determiner 27 provides a shortest code detection signal indicating that a 2T code has been detected and a shortest code amplitude NG detection signal indicating that the detected 2T is the resultant of decoding error to the shortest code corrector 26.

The shortest code corrector 26 performs correction of the shortest code (2T) in a binary data string on the basis of a shortest code detection signal and a shortest code amplitude NG detection signal obtained as a result of determination performed by the shortest code amplitude determiner 27.

Specifically, if it is determined that the 2T code in a binary data string has been generated as a result of correct decoding, the binary data string is output without changes. On the other hand, if it is determined that the 2T code has been generated due to decoding error, i.e., the 2T code is detected by the shortest code detection signal and it is determined by the shortest code amplitude NG detection signal that the 2T code is incorrect, each of the bits forming the 2T code is inverted.

The binary data sting output from the shortest code corrector 26 is supplied to the downstream circuits, i.e., the frame sync detection/sync protection circuit 6 and the encoding/decoding unit 7 shown in FIG. 1, as a binary data string decided by the data signal processing circuit 5.

This binary data string output from the shortest code corrector 26 is considered as decoded data having a lower bit error rate than a bit error rate of decoded data obtained by known signal detection through typical maximum likelihood decoding.

The disc drive apparatus in this example is assumed to be compatible with a Blu-ray disc. Thus, the minimum code length used for the processing of the shortest code corrector 26 and the shortest code amplitude determiner 27 is 2T. However, if the disc 90 is a CD or a DVD, the minimum code length is 3T.

In the following, an example of operations of the shortest code corrector 26 and the shortest code amplitude determiner 27 will be described. For PR equalization performed in this example, PR(a, b, a) equalization such as PR(1, 2, 1) equalization is applied.

In the case of PR (a, b, a), sample points of a PR equalized signal converge to four values: $+(2a+b) \times A$; $+b \times A$; $-b \times A$; $-(2a+b) \times A$, where A is a coefficient. In this example, the positive polarity (+) of the PR equalized signal corresponds to bit "1" of decoded data, and the negative polarity (−) of the PR equalized signal corresponds to bit "0" of the decoded data.

The description is continued with reference to FIG. 3 to FIG. 5.

Figure 3A:
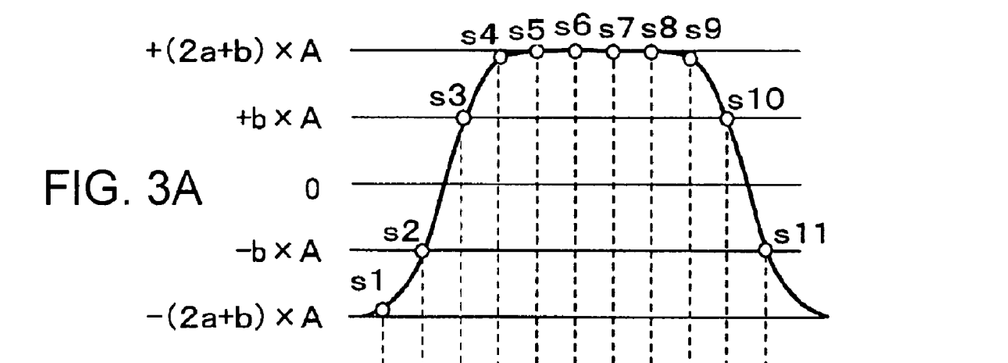
FIG. 3 illustrates an operation for correcting decoded data according to an embodiment of the present invention.

FIG. 3A illustrates a PR equalized signal output from the PR equalizer 24, and S1 to S11 indicate individual sample points (amplitude values) of the PR equalized signal.

Figure 3B:
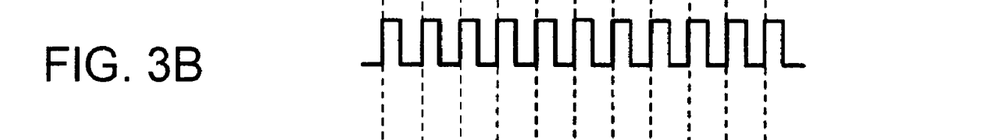

FIG. 3B illustrates a clock CK.

Figure 3C:
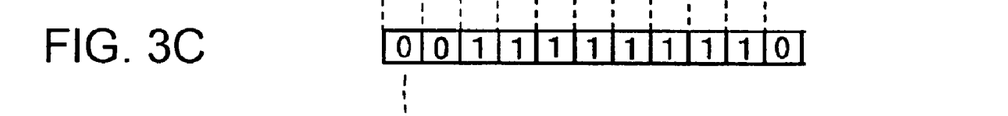

FIG. 3C illustrates a binary data string decoded by the maximum likelihood decoder 25.

Figure 3D:
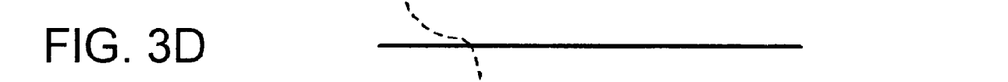
Figure 3E:
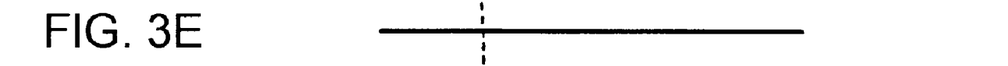

FIG. 3D and FIG. 3E illustrates a shortest code detection signal and a shortest code amplitude NG detection signal, respectively.

Figure 3F:
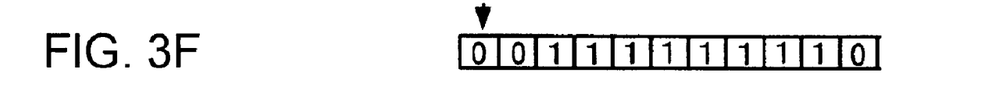

FIG. 3F illustrates a binary data string to be output from the shortest code corrector 26 (for ease of description, hereinafter referred to as a "corrected binary data string"). In this example, the corrected binary data string illustrated in FIG. 3F is output with a delay of two clocks with respect to the binary data string of FIG. 3C during the processing of the shortest code amplitude determiner 27 and the shortest code corrector 26.

FIG. 4A to FIG. 4F and FIG. 5A to FIG. 5F are similar to FIG. 3A to FIG. 3F.

FIG. 3A to FIG. 3F illustrate an ideal operation for a long code length. Specifically, the PR equalized signal corresponding to a code with a long length has no distortion as illustrated in FIG. 3A, and a binary data string "00111111110" as illustrated in FIG. 3C is obtained by the maximum likelihood decoder 25. In this case, there is no shortest code (2T code) in the binary data string, and thus the shortest code detection signal of the shortest code amplitude determiner 27 illustrated in FIG. 3D is maintained at "L" level indicative of no detected shortest code. Since no 2T code has been detected, correctness determination will not be performed. Accordingly, the shortest code amplitude NG detection signal is also maintained at "L" level indicative of no detected NG code.

Thus, the shortest code corrector 26 does not perform bit correction, and the binary data string of FIG. 3C is output as corrected binary data string, as illustrated in FIG. 3F.

FIG. 4A to FIG. 4F illustrates a PR equalized signal with a correct 2T code.

Figure 4A:
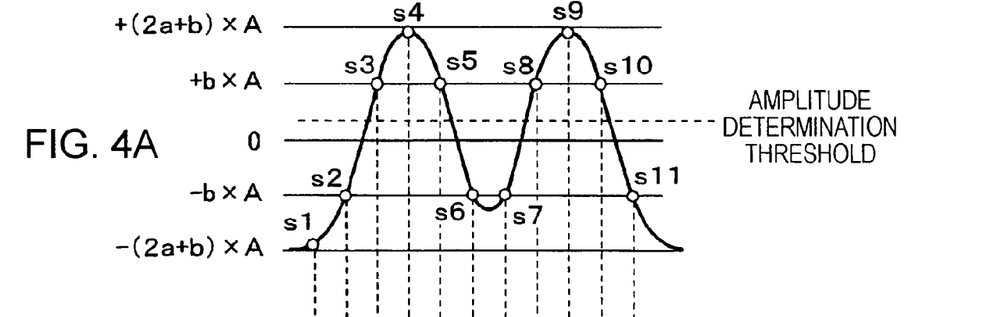
FIG. 4 illustrates an operation for correcting decoded data according to an embodiment of the present invention.
Figure 4B:
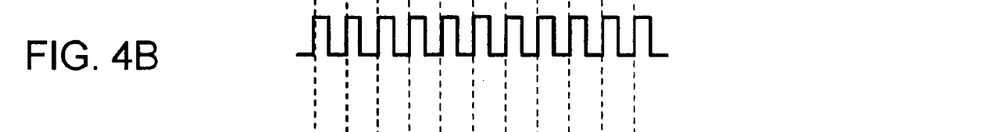

In this case, polarity inversion occurs in the PR equalized signal in accordance with the amplitude values at the sample points S6 and S7 as illustrated in FIG. 4A. In an actual PR equalized signal, polarity inversion may not occur due to waveform distortion occurring in a reproduction process caused by nose, recording distortion, defocusing of the optical pickup 1 or the like. Even in such a case, however, the amplitude values corresponding to the 2T code are distributed around zero.

Figures 4C, 4D:
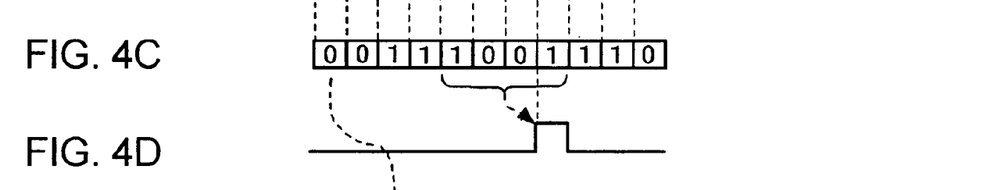

As a result, as illustrated in FIG. 4C, the decoded data corresponding to the sample points S5, S6, S7, and S8 is detected as "1 0 0 1" containing a 2T code.

Thus, when there is a 2T code in a decoded binary data string, the shortest code amplitude determiner 27 sets the shortest code detection signal to "H" level upon the detection of the 2T code, as illustrated in FIG. 4D.

In addition, upon the detection of the 2T code, the shortest code amplitude determiner 27 determines the correctness of the 2T code. In this case, the shortest code amplitude determiner 27 compares amplitude values of the PR equalized signal corresponding to the decoded data "1 0 0 1" with a predetermined amplitude determination threshold.

The amplitude values of the PR equalized signal corresponding to "00" in the decoded data "1 0 0 1" should be distributed around $-b \times A$. Thus, the upper limit of the distribution of amplitude values can practically be restricted even if the waveform distortion mentioned above is taken into account. Levels of the PR equalized signal corresponding to "00" refer to the amplitude values at the sample points S6 and S7. The magnitude of these amplitude values are compared with the amplitude determination threshold illustrated in FIG. 4A. The amplitude determination threshold will be described below.

If the amplitude values at the sample points S6 and S7 are greater than the amplitude determination threshold, the 2T code is determined to be the resultant of decoding error (incorrect code). On the other hand, if the amplitude values at the sample points S6 and S7 are less than the amplitude determination threshold, the 2T code is determined to be correct decoded data.

Figure 4E:
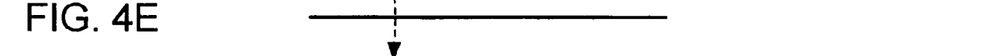

In the case of FIG. 4A, the 2T code is determined to be correct since the amplitude values at the sample point S6 and S7 are smaller than the amplitude determination threshold. Thus, the shortest code amplitude NG detection signal to be output from the shortest code amplitude determiner 27 is maintained at "L" level indicative of no detected NG code, as illustrated in FIG. 4E.

Figure 4F:
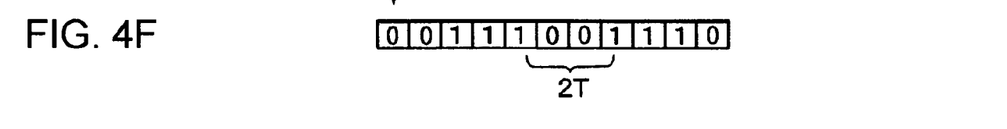

Accordingly, the shortest code corrector 26 does not perform bit correction of the 2T code, and the binary data string of FIG. 4C serves as a corrected binary data as illustrated in FIG. 4F and is output from the shortest code corrector 26 as a decoding result data containing the 2T code.

FIG. 5A to FIG. 5F illustrate an example of a PR equalized signal on the basis of which a 2T code is erroneously detected in a process of maximum likelihood decoding due to distortion of recording signals.

Figure 5A:
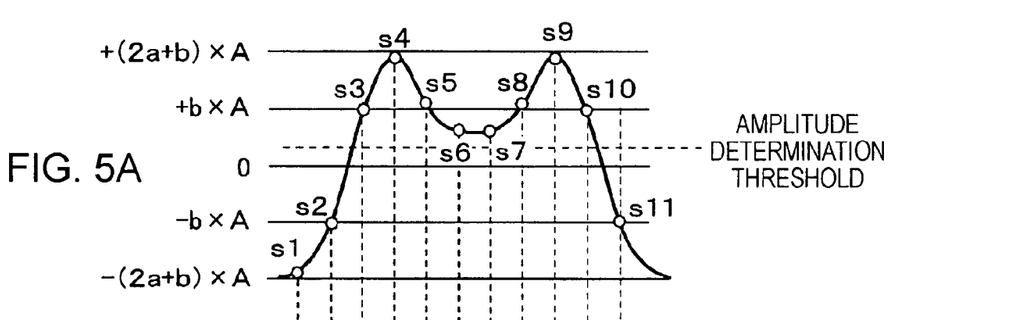
FIG. 5 illustrates an operation for correcting decoded data according to an embodiment of the present invention.
Figure 5B:
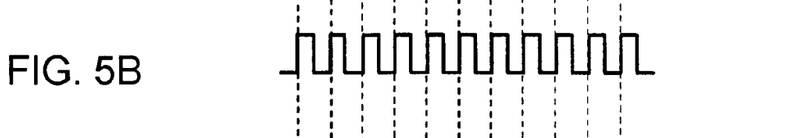

In this case, a small concave portion is produced in a PR equalized signal waveform, as illustrated in FIG. 5A. In other words, the amplitude values at the sample points S5, S6, S7, and S8 decreases. Due to this decrease, the maximum likelihood decoder 25 erroneously detects that decoded data corresponding to the sample points S5, S6, S7, and S8 as "1 0 0 1" containing a 2T code.

This detection error occurs due to the basic characteristics of maximum likelihood decoding. However, the detection error also occurs under the following decoding condition.

For example, when a correct PR equalized signal corresponding to a long mark length as illustrated in FIG. 3A is obtained, the amplitude values at the sample points S4, S5, S6, S7, S8, and S9 can be set to $+(2a+b) \times A$, $+(2a+b) \times A$, $+(2a+b) \times A$, $+(2a+b) \times A$, $+(2a+b) \times A$, and $+(2a+b) \times A$, respectively, and decoding is performed on the basis of the amplitude values. As a result, the correct decoded data corresponding to the long mark length is obtained, as illustrated in FIG. 3C. On the other hand, if there is a small concave portion in the PR equalized signal waveform, as illustrated in FIG. 5A, decoding is performed on the basis of the amplitude values at the sample points, S4, S5, S6, S7, S8, and S9, which are +(2a+b)×A, +b×A, +b×A, +b×A, +b×A, and +(2a+b)×A, respectively. In the decoding process, there can be a case where it is determined that the four consecutive amplitude values of +b×A are unlikely to occur and that the amplitude values at the sample points S6 and S7 are likely to be −b×A and −b×A, respectively. This results in incorrect decoding in which a 2T code is contained in the PR equalized signal, as illustrated in FIG. 5C.

In many cases, such a concave portion is produced around the center of a PR equalized signal waveform corresponding to a long mark length as illustrated in FIG. 5A due to the shape of a mark recorded on the disc 90. For example, it is found that such a PR equalized signal waveform may be generated if a middle portion of a recorded mark is recessed or protruding in a radial direction.

Figure 5C:
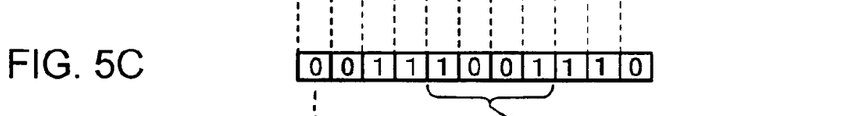

In the case where decoded data containing a 2T code is obtained while such a 2T code does not actually exist, as illustrated in FIG. 5C, the shortest code amplitude determiner 27 operates as follows.

Figure 5D:
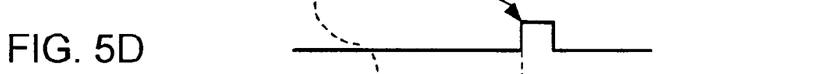

Since the decoded binary data string contains a 2T code, the shortest code amplitude determiner 27 sets the shortest code detection signal to "H" level in response to the detection of the 2T code, as illustrated in FIG. 5D.

Further, in response to the detection of the 2T code, the shortest code amplitude determiner 27 determines the correctness of the 2t code. Specifically, the shortest code amplitude determiner 27 compares the amplitude values of the PR equalized signal corresponding to the decoded data "1 0 0 1" with the amplitude determination threshold. That is, the magnitude of the amplitude values at the sample points S6 and S7 corresponding to "00" in the decoded data "1001" is compared with the magnitude of the amplitude determination threshold illustrated in FIG. 5A.

Figure 5E:
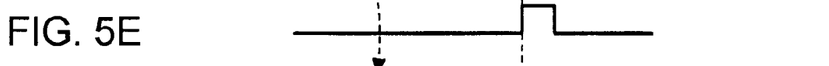
Figure 5F:
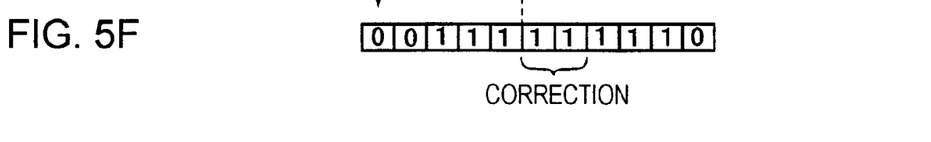

In the case of FIGS. 5A to 5F, contrary to the case of FIGS. 4A to 4F, the amplitude values at the sample points S6 and S7 are grater than the amplitude determination threshold. Thus, the 2T code is determined to be incorrect decoded data, and the shortest code amplitude determiner 27 outputs an "H" level signal as a shortest code amplitude NG detection signal indicative of detection of a NG code, as illustrated in FIG. 5E.

In response to the shortest code amplitude NG detection signal, the shortest code corrector 26 performs bit correction of the 2T code in the decoded data. Specifically, in the correction processing, each of the bits of the 2T code is inverted from "0" to "1", and as a result the data "1001" is corrected to "1111". Consequently, the shortest code corrector 26 outputs a corrected binary data string as decoded data that does not contain a 2T code.

In a case where the polarity of a PR equalized signal is opposite to that of the PR equalize signal illustrated in FIG. 4A and FIG. 5A, the above determination of the correctness of a 2T code and code correction are similarly performed. In such a case, a binary data string as a result of decoding contains "0110". Needless to say, the relationship between the magnitude of the amplitude values of the PR equalized signal corresponding to "11" in the decoded data "0110" and that of the amplitude determination threshold is reversed. Specifically, the 2T code is determined to be correct if the amplitude values of the PR equalized signal corresponding to the 2T code "11" are greater than the amplitude determination threshold. On the other hand, the 2T code is determined to be an incorrect code caused by a decoding error if the amplitude values of the PR equalized signal corresponding to the 2T code "11" are smaller than the amplitude determination threshold. If the 2T code in the decoded data "0110" is determined to be incorrect, the shortest code corrector 26 inverts each bit of the 2T code and thus the decoded data is corrected to "0000" for output.

Figure 6A:
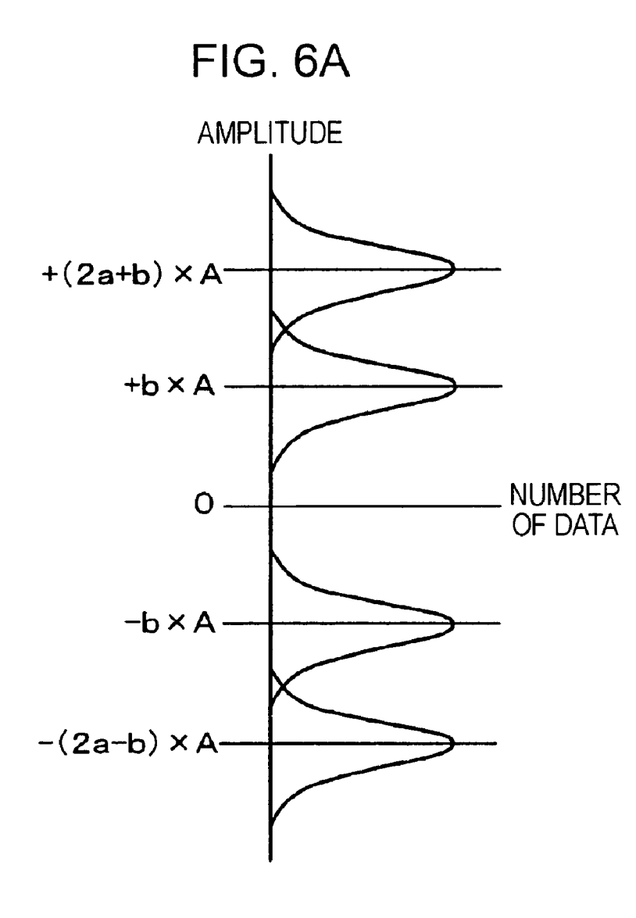
FIG. 6 illustrates a distribution of amplitude values of a PR equalized signal.
Figure 6B:
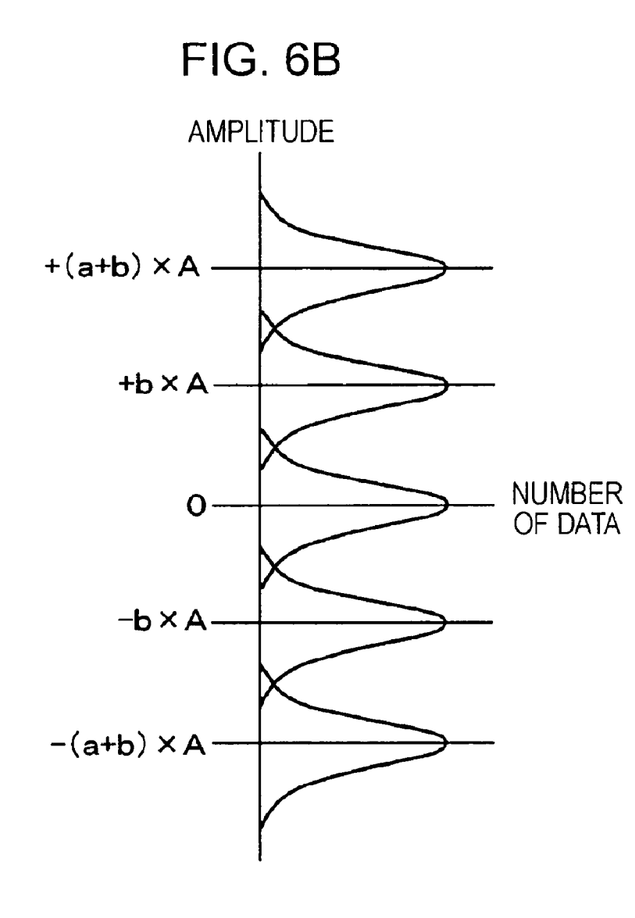
Figure 7:
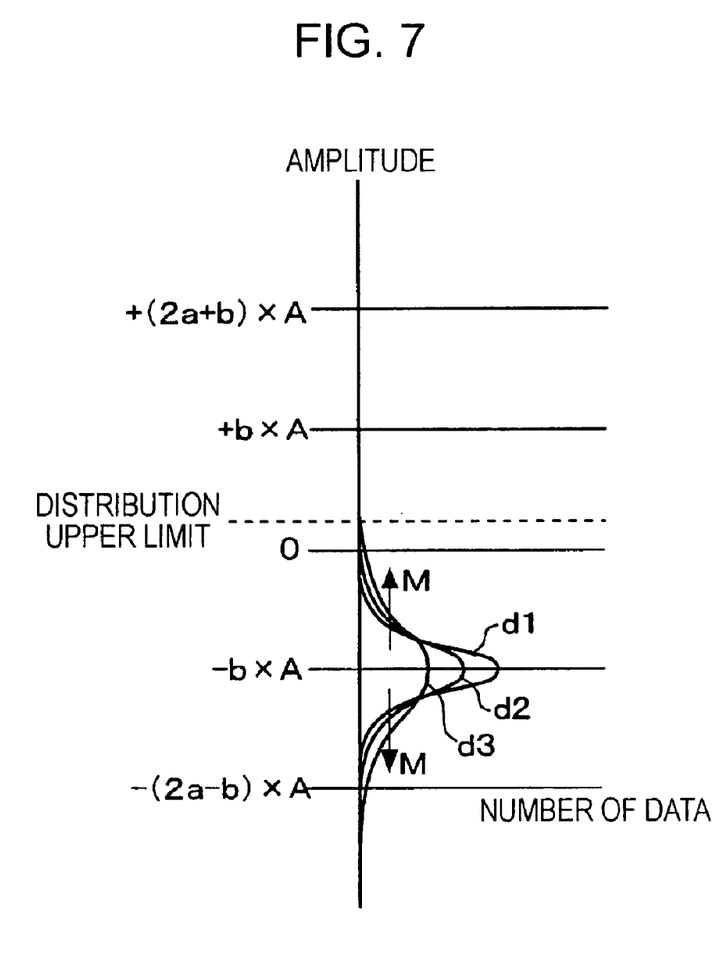
FIG. 7 illustrates setting of an amplitude determination threshold.
Figure 8:
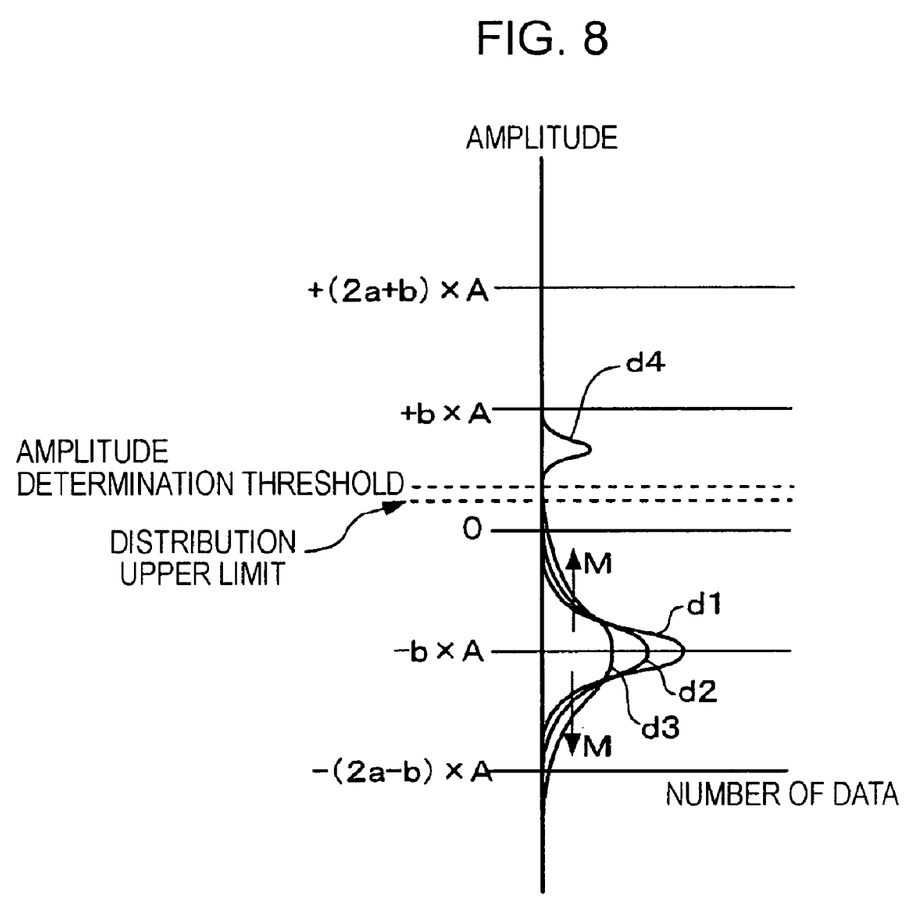
FIG. 8 illustrates setting of an amplitude determination threshold.

Referring now to FIG. 6 to FIG. 8, the amplitude determination threshold will be described.

As described above, the amplitude values of a PR equalized signal corresponding to a shortest code 2T is compared with the amplitude determination threshold. Thus, when the 2T is decoded by the maximum likelihood decoder 25 the correctness of the 2T code is determined. This indicates that an appropriate setting of the amplitude determination threshold as a determination condition is necessary.

FIG. 6A and FIG. 6B illustrates distributions of amplitude values of signals which have undergone PR equalization processing (i.e., a PR equalized signal). Amplitude values are plotted (ordinate) against the number of data (abscissa) (1=an amplitude value at one sample point). FIG. 6A illustrates a case of PR(a, b, a) equalization where the minimum code length is 2T. FIG. 6B illustrates a case of PR(a, b, b, a) equalization where the minimum code length is 3T.

As can be seen from the figures, the amplitude values of a PR equalized signal are distributed around four values in the case of PR(a, b, a) where the minimum code length is 2T, and are distributed around five values in the case of PR(a, b, b, a) where the minimum code length is 3T.

FIG. 7 illustrates an example of a distribution of amplitude values in a case of PR(a, b, a) equalization and decoded data has a bit pattern "1001", which corresponds to the amplitude values at the sample points S6 and S7, as illustrated in FIG. 4A, for example. In this case, the amplitude values are distributed around −b×A.

It is preferable that the shape of the distribution is narrow as illustrated as a distribution d1. However, the variation of actual amplitude values can increases due to various factors such as defocusing of the optical pickup 1 and tilt of the disc 90. In this case, the distribution of amplitude values may be broadened in a direction indicated by an arrow M, as illustrated as a distribution d2 and a distribution d3.

This broadening of the distribution (decreased convergence) means an increase in the possibility of occurrence of a decoding error. There may be a case where the range of the distribution further increases (e.g., the distribution becomes broader than the distribution d3). The increase in the distribution to this extent indicates that the subsequent processing of demodulation and ECC error correction is not effective. The processing of decoded data correction discussed in this example is not intended for such a broad distribution of amplitude values. Therefore, such a case needs not be taken into account in practice, and it can be assumed that the range of the distribution does not increase to a certain magnitude, depending on the ECC correction performance. Thus, an upper limit of distribution as indicated in FIG. 7 may be set.

FIG. 8 illustrates an example of a distribution of amplitude values indicated as a distribution d4, which results in an erroneous decoded data "1001" is produced due to a small concave portion in a PR equalized signal waveform, as in the case of FIG. 5A. The distributions of d1, d2, and d3 are obtained when a correct decoded data "1001" is obtained as in the case of FIG. 7. The distribution d4 associated with erroneous decoding has a polarity opposite to the distributions d1, d2, and d3 corresponding to the correct decoded data "1001". However, as illustrated in FIG. 5, decoding error generally occurs when a concave portion in the PR equalized waveform becomes large to a certain degree. Thus, no decoding error occurs where the amplitude value is large, and thus a distribution such as the distribution d4 is produced.

If an upper limit of the distributions of d1, d2, and d3 corresponding to the correct decoded data "1001" is set as described above, the amplitude determination threshold can be set taking into account a lower limit of the distribution of the distribution d4 and the upper limit of the distributions of d1, d2, and d3, as illustrated in FIG. 8.

That is, a case of an erroneous decoding of a 2T code and a case of a correct decoding of a 2T code can clearly be distinguished using the amplitude determination threshold in FIG. 8 as the boundary.

Thus, using an amplitude determination threshold, the shortest code amplitude determiner 27 can determine the correctness of decoding data by comparing the amplitude values of a PR equalized signal with the amplitude determination threshold for both the cases illustrated in FIG. 4 and FIG. 5.

As described above, the shortest code amplitude determiner 27 determines the correctness of a 2T code in a binary data string as decoded data output from the maximum likelihood decoder 25. Then, if the shortest code amplitude determiner 27 determines that the 2T code is incorrect, the shortest code corrector 26 corrects the 2T code. This technique can advantageously reduce a bit error rate of a signal with distortion compared with a known signal detection technique using a typical maximum likelihood decoder, while taking advantage of maximum likelihood decoding.

As a result of the reduced bit error rate, the data reproduction performance of a reproducing apparatus can be enhanced, allowing the reproducing apparatus to appropriately reproduce data recorded on a recording medium whose recording signal quality is relatively poor.

In addition, the shortest code amplitude determiner 27 simply serves to perform comparison between amplitude values of a PR equalized signal and the amplitude determination threshold, and the shortest code corrector 26 simply serves to invert a shortest code if the shortest code is determined to be incorrect. This arrangement simplifies the circuit configuration and facilitates LSI (large-scale integrated) implementation, which is also advantageous in view of power consumption and operation speed.

In addition, as described above, when there is a 2T code in a binary data string as a decoding result of the maximum likelihood decoder 25, the shortest code amplitude determiner 27 determines whether or not the 2T code is correct by comparing the amplitude values of a PR equalized signal corresponding to the 2T code (i.e., the amplitude values at the sample points S6 and S7) with the amplitude determination threshold. In addition to the above, various schemes of the comparison and correctness determination can also be employed.

For example, the amplitude values at the sample points S6 and S7 and the amplitude determination threshold are compared, and a 2T code may be determined to be incorrect if both the amplitude values at the sample points S6 and S7 are greater than the amplitude determination threshold or if either of the amplitude value at the sample point S6 or the amplitude value at the sample point S7 is greater than the amplitude determination threshold.

Alternatively, it is also possible that only one of the amplitude values at the sample points S6 and S7 is compared with the amplitude determination threshold.

Further, it is possible that an average value of the amplitude values at the sample points S6 and S7 or an average value of the amplitude values at the sample points S6 and S7 each assigned with a weight is compared with the amplitude determination threshold. In addition, an average value of the amplitude values at four sampling points S5, S6, S7, and S8 or a weighted average value of the amplitude values at the four sampling points may be compared with the amplitude determination threshold.

The amplitude determination threshold can be a predetermined fixed value. However, a plurality of amplitude determination thresholds may be prepared for selection. Alternatively, one amplitude determination threshold is set so as to be adjustable. For example, the amplitude determination threshold may be selected from a plurality of amplitude determination thresholds or adjusted, in accordance with the manufacturer or the type of a disc drive apparatus that has recorded data on the disc 90. It is also possible to monitor a distribution of amplitude values of a PR equalized signal during data reproduction, and the amplitude determination threshold is changed in accordance with the monitoring result.

In this embodiment, the disc drive apparatus is assumed to be compatible with a Blu-ray disc, on the basis of which the operations of the shortest code corrector 26 and the shortest code amplitude determiner 27 on a code of minimum length 2T ("1001", "0110") are described above. However, when the minimum code length is 3T as in the case of a CD or a DVD and a 3T code such as "10001" or "01110" is obtained as decoded data, similar operations are performed by the shortest code corrector 26 and the shortest code amplitude determiner 27. The operations of the shortest code corrector 26 and the shortest code amplitude determiner 27 are similarly performed for another minimum code length.

That is to say, the present invention can be applied not only to a reproducing apparatus compatible with a Blu-ray disc but also to a reproducing apparatus compatible with various media and a reproducing method.

In PR equalization, when an odd constraint length such as PR (a, b, a) and PR (a, b, c, b) is employed, the bits "1" and "0" of decoded data correspond to the sampling phase of a PR equalization waveform. Thus, there is one-to-one correspondence between the bits of decoded data and the amplitude values (sample points) of the PR equalized signal, as illustrated in FIG. 4 and FIG. 5.

On the other hand, however, when an even constraint length such as PR (a, b, b, a) is employed, the decoded data and the sampling phase of a PR equalized waveform are shifted by ½T. Thus, there is no one-to-one correspondence between the bits of the decoded data and the amplitude values (sample points) of the PR equalized signal.

FIG. 9 and FIG. 10 illustrates a case of PR (a, b, b, a) equalization. In this case, the minimum code length is assumed to be 3T.

As can be seen from the figures, sample points S1 to S16 of a PR equalized signal correspond to falling edges of a clock CK, and the bit timing of the decoded data corresponds to rising edges of the clock CK.

Accordingly, the determination of the correctness of a 3T code in this case is performed using four amplitude values at the sample points S7, S8, S9, and S10 of a PR equalized signal which correspond to a bit pattern "000" in "10001" (shortest code+1 sample).

Figure 9A:
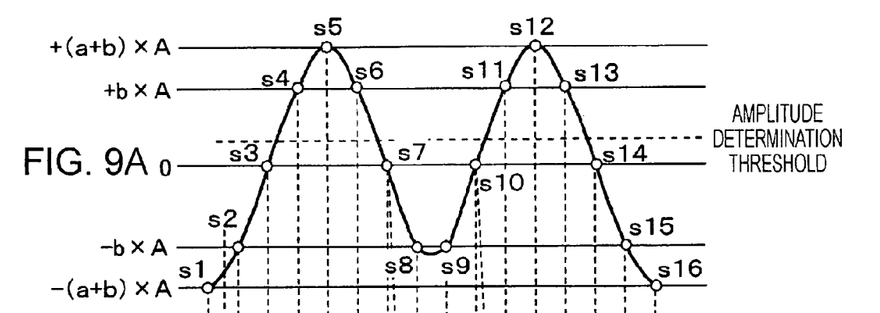
FIG. 9 illustrates an operation for correcting decoded data according to an embodiment of the present invention.
Figure 9B:
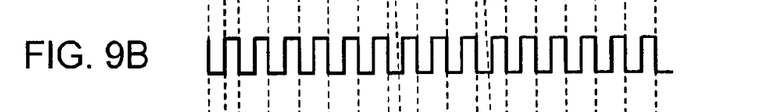
Figure 9C:
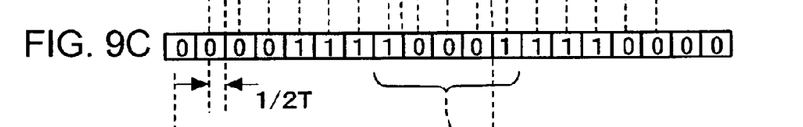
Figure 9D:
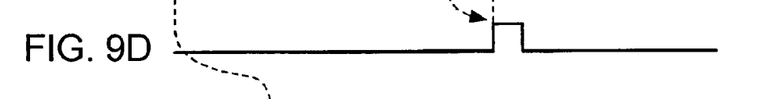
Figure 9E:
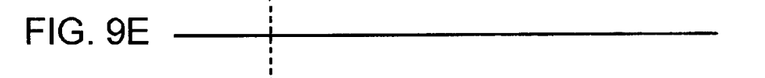
Figure 9F:
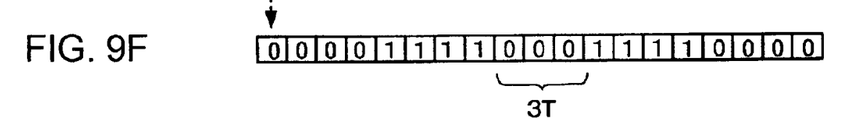

FIG. 9A to FIG. 9F illustrate a case in which, when a 3T code is produced as decoded data, as illustrated in FIG. 9C, the amplitude values at the sample points S7, S8, S9, and S10 corresponding to the 3T code are compared with the amplitude determination threshold, and as a result the 3T code is determined to be correct and thus the 3T code is output without changes, as a corrected decoded data, as illustrated in FIG. 9F.

Figure 10A:
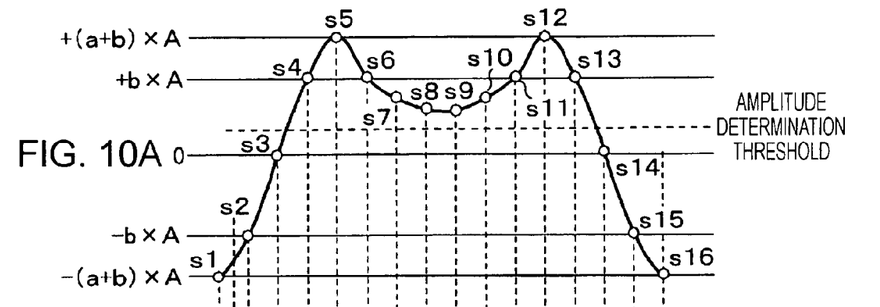
FIG. 10 illustrates an operation for correcting decoded data according to an embodiment of the present invention.
Figure 10B:
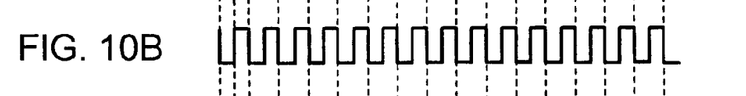
Figures 10C, 10D:
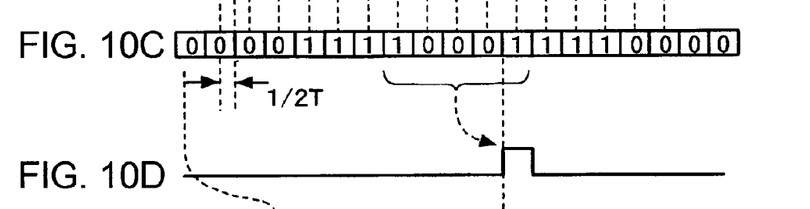
Figure 10E:
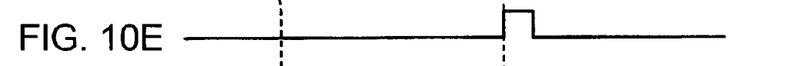
Figure 10F:
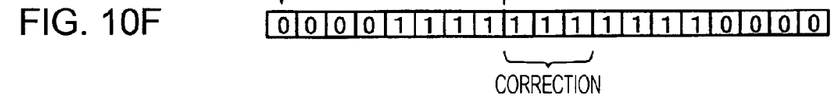

On the other hand, FIG. 10A to FIG. 10F illustrate a case in which, when a 3T code is produced as decoded data as illustrated in FIG. 10C, the amplitude values at the sample points S7, S8, S9, and S10 corresponding to the 3T code are compared with an amplitude determination threshold, and as a result the 3T code is determined to be incorrect. Thus, the shortest code amplitude NG detection signal is set to "H" level as illustrated in FIG. 10E, and the 3T code is corrected by bit inversion and a corrected decoded data is output as illustrated in FIG. 10F.

In the above cases, the amplitude values at the sample points S7, S8, S9, and S10 are compared with the amplitude determination threshold. It is also possible that an average value of the four amplitude values is compared with the amplitude determination threshold.

Alternatively, the amplitude value at each of the sample points S8 and S9 or only one of the amplitude values at the sample points S8 and S9 can be compared with the amplitude determination threshold. Further, it is also possible that an average value of the amplitude values at the sample points S8 and S9 is compared with the amplitude determination threshold.

Moreover, an average value of the amplitude values at two or three out of the four sample points S7, S8, S9, and S10 or an average value of the amplitude values at the four sample points each assigned with a weight can be compared with the amplitude determination threshold.

It should be understood by those skilled in the art that various modifications, combinations, sub-combinations and alterations may occur depending on design requirements and other factors insofar as they are within the scope of the appended claims or the equivalents thereof.

The invention claimed is:

1. A reproducing apparatus for reproducing information from a recording medium on which information is recorded using a run-length-limited code in which a shortest code and a longest code are defined, the reproducing apparatus comprising:
  a signal reading unit to read a signal from the recording medium;
  an equalizing unit to perform partial response equalization on the signal and output an equalized signal;
  a maximum likelihood decoding unit to perform maximum likelihood decoding on the equalized signal and outputting a binary data string;
  a determining unit to determine whether or not the shortest code in the binary data string obtained by the maximum likelihood decoding is a result of a decoding error during the maximum likelihood decoding, based on information on an amplitude of the equalized signal corresponding to the shortest code;
  a code correcting unit to correct the shortest code in the binary data string, in accordance with a result of the determination of the determining unit; and
  a data demodulating unit to demodulate the binary data string obtained through the code correcting unit to obtain reproduction data from the recording medium.

2. The reproducing apparatus of claim 1,
  wherein the determining unit determines whether or not the shortest code in the binary data string is the result of the decoding error based on a result of a comparison between the information on the amplitude of the equalized signal corresponding to the shortest code and a predetermined amplitude determination threshold.

3. The reproducing apparatus of claim 2,
  wherein, when the information on the amplitude of the equalized signal is greater than the predetermined amplitude determination threshold, it is determined that the shortest code is the result of the decoding error.

4. The reproducing apparatus of claim 2,
  wherein, when the information on the amplitude of the equalized signal is less than the predetermined amplitude determination threshold, it is determined that the binary string is correctly identified to comprise the shortest code.

5. A reproducing method for reproducing information from a recording medium on which information is recorded using a run-length-limited code in which a shortest code and a longest code are defined, the method comprising the steps of:
  outputting an equalized signal by performing partial response equalization on a signal read from the recording medium;
  performing maximum likelihood decoding on the equalized signal and outputting a binary data string;
  determining whether or not the shortest code in the binary data string obtained by the maximum likelihood decoding is a result of a decoding error during the maximum likelihood decoding, based on information on an amplitude of the equalized signal corresponding to the shortest code;
  correcting the shortest code in the binary data string, in accordance with a result of the determination; and
  demodulating the binary data string obtained through the correction to obtain reproduction data from the recording medium.

* * * * *